Sept. 1, 1931.  F. H. MACHEN  1,821,522
RAKE
Filed April 30, 1930
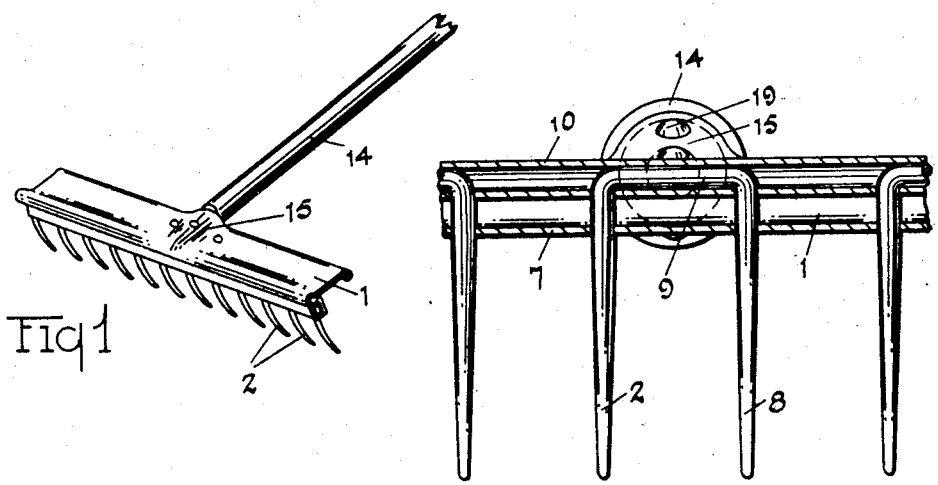
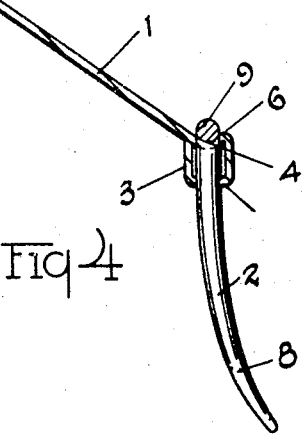
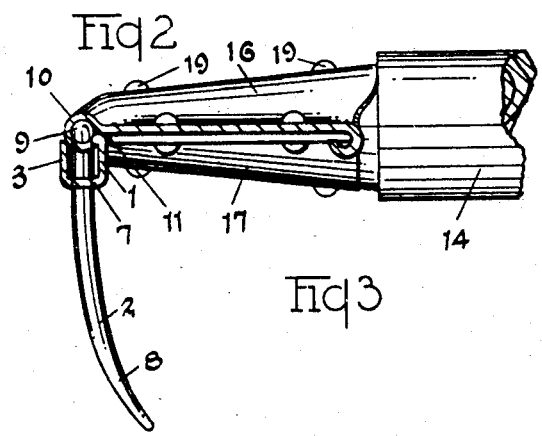
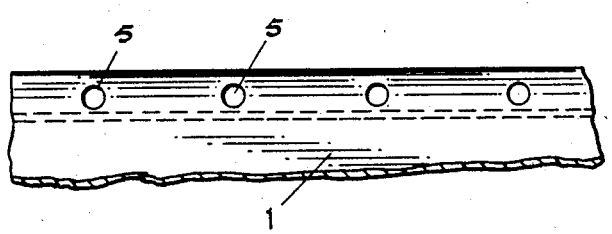
Inventor
Ferdinand H. Machen
By Faust F. Crampton
Attorney Patented Sept. 1, 1931

1,821,522

UNITED STATES PATENT OFFICE

FERDINAND H. MACHEN, OF TOLEDO, OHIO

RAKE

Application filed April 30, 1930. Serial No. 448,707.

My invention has for its object to provide an efficient light weight garden rake that may be made at a low cost of production. The object of the invention is to provide a rake that is particularly adapted for raking lawns, such as for collecting leaves and grass.

The invention may be contained in structures that vary in their details and, to illustrate a practical application of the invention, I have selected a rake embodying the invention, and shall describe it hereinafter. The structure selected is shown in the accompanying drawings.

Fig. 1 is a perspective view of the rake. Fig. 2 is a view of a longitudinal section of the rake. Fig. 3 is a view of a transverse section of the rake. Fig. 4 illustrates a section of a part of the rake. Fig. 5 is a top view of a portion of one of the parts shown in Fig. 4.

In the particular form of construction shown in the figures, the rake is provided with a sheet metal part 1, and a plurality of bent U-shaped wire members 2, that form the teeth or prongs of the rake. The sheet metal part 1 is forced to have an oblong portion 3, substantially rectangular in its cross section, one side preferably being formed in the shape of a semi-cylindrical groove 4. The oblong portion 3, of the sheet metal piece 1, is provided with a plurality of holes 5 located in spaced relation in the top and bottom walls 6 and 7 of the oblong portion 3. The wire members 2 have suitable curved end portions 8 that form the teeth of the rake and are insertible through the holes 5. The sheet metal part 1 is then bent over the bases 9 of the U-shaped wire members 2 and so as to enclose the portions 9 in the cylindrical portion of the sheet metal piece 1 formed by the top wall 6 and the semi-cylindrical portion 10. When the sheet metal part 1 has been bent over the portion bases 9, of the U-shaped members 2, it may be spot welded, as at 11, to secure the piece 1 to the corner of the oblong portion 3. The piece 1 is also provided with a socket 15 that may be formed by bending the sheet metal part 1 to form a tapered portion 16, and a U-shaped sheet metal member 17, located on the under side of the piece 1, and riveted thereto. The handle 18 may be inserted in the socket that is thus formed and secured therein by a pair of pins 19.

Thus, I have provided an efficient light weight rake that may be cheaply made and wherein the prongs are formed of an elastic material that gives flexibility to the rake.

I claim:

In a rake, a plurality of pairs of prongs of short lengths formed of elastic wire bent U-shape, a sheet metal part shaped to have an oblong portion substantially rectangular in cross section, the top wall of the oblong portion bent to form a semi-cylindrical trough, a portion of the sheet metal part bent semi-cylindrically to enclose the bases of the U-shape prongs within the said semi-cylindrical top wall, the lower wall of the oblong portion having openings through which the prongs extend, a handle member, and means for connecting the handle member to the sheet metal part.

In witness whereof I have hereunto signed my name to this specification.

FERDINAND H. MACHEN.